No. 768,574.　　　　　BEST AVAILABLE COPY　　　　　Patented August 23, 1904.

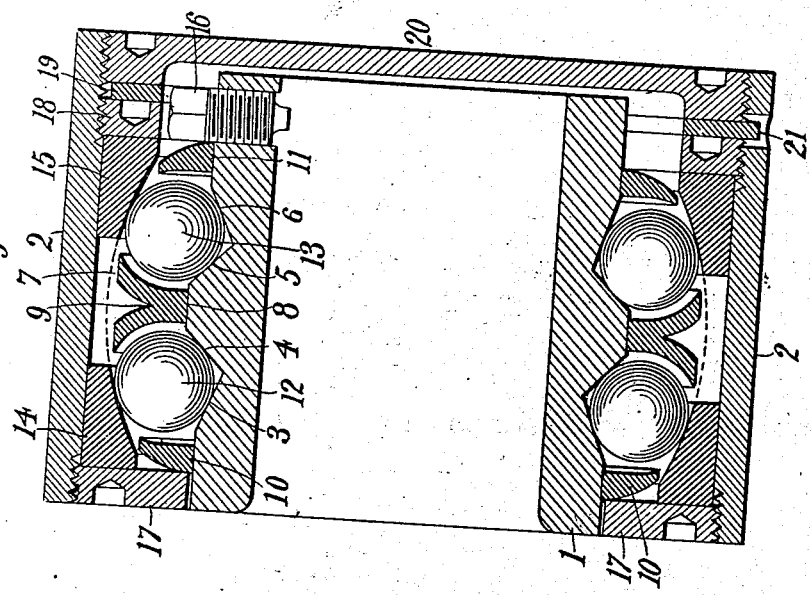
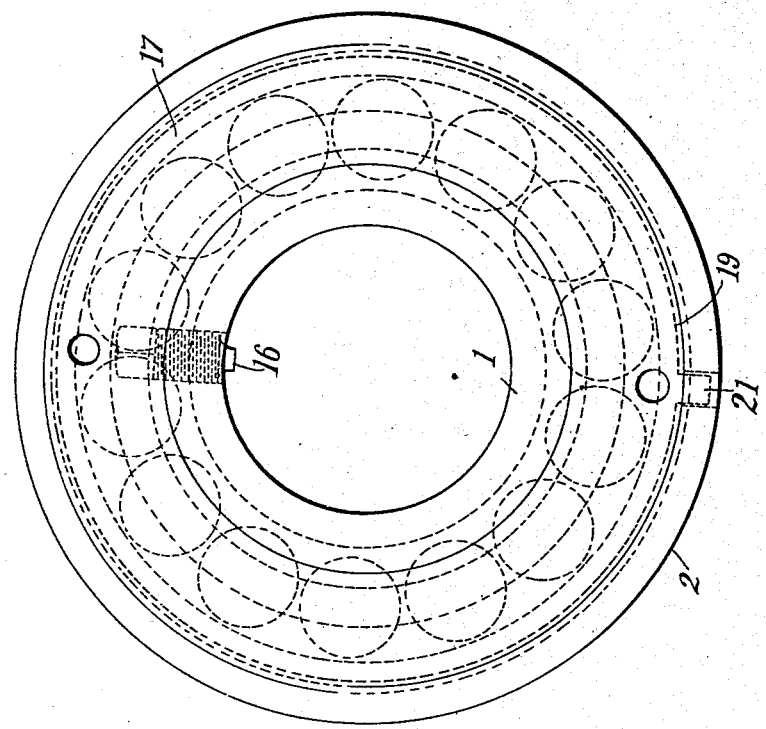

UNITED STATES PATENT OFFICE.

VIETTS L. RICE, OF NEW YORK, N. Y.

ANTIFRICTION-BEARING.

SPECIFICATION forming part of Letters Patent No. 768,574, dated August 23, 1904.

Application filed May 12, 1903. Serial No. 156,743. (No model.)

*To all whom it may concern:*

Be it known that I, VIETTS L. RICE, a citizen of the United States, residing in the borough of Manhattan, city of New York, county of New York, and State of New York, have invented certain new and useful Improvements in Antifriction-Bearings, of which the following is a specification, reference being had therein to the accompanying drawings.

My invention relates to antifriction-bearings, and particularly to that type known as "ball-bearings," and has for its objects simplicity of construction and effectiveness of operation.

According to my invention I employ an outer bearing part the bearing-surfaces of which are shaped to conform to portions of a sphere, so as to provide within the limitations of ordinary variations of alinement a universal joint, and thereby to relieve the bearing from all strain due to variations of alinement. Also according to my invention the bearing is closed in the outer parts thereof, so that a considerable quantity of lubricant may be held therein without leakage. According to my invention an inner bearing part provides a plurality of ball-races with two bearing-points for each ball, and according to my invention such inner bearing part is one integral piece. According to my invention the outer bearing part has bearing-surfaces oblique to the axis of the bearing and comprises a plurality of bearing-blocks having a smooth cylindrical fit in an outer casing-sleeve, and thrust-resisting means are provided, which also effect the closing of the bearing against the escape of the lubricant.

I will now describe the construction embodying my invention illustrated in the accompanying drawings, and will thereafter point out my invention in claims.

Figure 1 is a face view of the bearing. Fig. 2 is a vertical central section of the same.

The bearing is composed of an inner tube 1 and an outer tube 2, the inner tube being the foundation of the bearing-core and carrying all the operative bearing elements and the outer tube carrying the bearing-blocks and the sealing and restraining rings and washers.

The core-foundation comprises a tube 1 with circumferential grooves, of which the sides 3 4 5 6 are angularly arranged with reference to the periphery of the tube and to each other. A ring 7, fitting the surface 8 between the grooves, is provided with surfaces concave toward the grooves and forming therewith interior retainers for the balls, the upper edge of such ring presenting a surface in the nature of a zone, which is grooved at 9 for lightness. Outer retaining-rings 10 and 11 are convex on their outer and concave on their inner surfaces, and the balls 12 and 13 are adapted to rest between the outer edges of these retainers and to rest in the angular ball-race in such manner that but two points of bearing are presented to the ball. The bearing-blocks 14 and 15 are in the form of two rings of practically the same construction, each of which provides a third bearing for its balls. The inner or bearing surface of each bearing-block is shaped in the form of the surface of a geometric sphere concentric with the axis of the bearing and with its center located between the bearing-blocks, the configuration of this geometric sphere between the bearings being indicated by broken lines. Each bearing-surface of the bearing-blocks is therefore a zone of a sphere, and the bearing is a true spherical bearing and universal within the limits of ordinary variations of alinement resulting from the stress of parts. These bearing-blocks 14 and 15 have smooth outer cylindrical peripherie which fit tightly within the outer sleeve 2 of the bearing, and the bearing is closed at one end, the left end in Fig. 2, by an exteriorly threaded closing-ring 17, screwed into the outer sleeve 2 and fitting upon the inner sleeve with sufficient play to permit of the relative movements of the outer and inner sleeve, which the spherical bearing is designed to accommodate, which would usually be of the variations of alinement due to slight imperfections of construction or stress parts. The bearing is closed at its other end by a closing-plate 20, which is also exteriorly threaded and screwed into the outer sleeve and where the bearing is designed for a s, terminating at this end within the bearing, is the bearing shown, this plate completely closes the opening of the outer sleeve. An inner clamping-ring 18 is provided, which is exteriorly threaded and which bears against the right bearing-block 15 at this side of the bearing, and a washer 19 is interposed between the inner clamping-ring 18 and the outer closing-plate 20, this washer having a projection 21 entering a notch in the outer sleeve 2 to hold the washer from rotation during the screwing or unscrewing of the closing-plate, and thus to prevent disturbance of the adjustment of the inner clamping-ring 18.

It will be observed that in the bearing thus provided there are two inner bearing-points for each ball and that these inner bearing-points for the balls are in circles which are at all times in planes at right angles to the axis of the shaft, assuring the revolution of the balls at all times in planes at right angles to the axis of the shaft. It will also be observed that each ball has a single outer bearing-point on the inner spherical surface of a bearing-block, each such bearing-point being in a portion of such surface oblique to the axis of the bearing, so that both bearing-blocks receive an outward thrust, these thrusts being opposed to each other and balanced in the bearing as a whole and being resisted by the sealing-ring 17 at one end of the bearing and by the inner clamping-ring 18 at the other end of the bearing. It will also be observed that a non-leaking receptacle for lubricating-oil is provided, as when at rest it may be charged with oil up to the inner edge of the sealing-ring 17, and when in motion the oil will be thrown farther outward in the bearing by centrifugal force and cannot escape therefrom. It will also be observed that the inner bearing-sleeve 1 is a single integral piece providing bearings for both sets of balls and is not composed of separate parts secured together by screw-threads or otherwise and is therefore not subject to inaccuracies from unequal wear of screw-threads or irregular shaping of screw-threads or imperfect fitting of the parts and that the outer bearing-blocks have smooth cylindrical bearings in the outer casing-sleeve 2 and are not threaded therein and are similarly not subject to inaccuracies from unequal wear of screw-threads or irregular shaping of screw-threads.

It is obvious that various modifications may be made in the construction shown and above particularly described within the spirit and type of my invention.

What I claim, and desire to secure by Letters Patent, is—

An antifriction-bearing having an inner integral bearing part providing two ball-races with two points of contact for each ball, an outer casing-sleeve, two outer bearing-blocks having inner surfaces providing one point of contact for each ball on a portion of such surface oblique to the axis of the bearing, the surfaces containing such bearing-points on each of such bearing-blocks being inclined oppositely to the surfaces containing such bearing-points on the other bearing-block, and having outer surfaces with a smooth cylindrical fit in the outer casing-sleeve, balls in contact with the inner bearing part and outer bearing-blocks, and thrust-resisting means for holding the outer bearing-blocks against the thrust of the balls.

2. An antifriction-bearing having an inner integral bearing part providing a plurality of ball-races with two points of contact for each ball, outer bearing-races of spherical form providing one point of contact for each ball on a portion of the inner surfaces of such outer bearing-races which is oblique to the axis of the bearing, and balls in contact with such races.

3. An antifriction-bearing having an inner bearing part providing two ball-races with two points of contact for each ball, an outer casing-sleeve, outer bearing-blocks having inner spherical surfaces providing one point of contact for each ball on a portion of such surface oblique to the axis of the bearing, the surfaces containing such bearing-points on each of such bearing-blocks being inclined oppositely to the surfaces containing such bearing-points on the other bearing-block, and having outer surfaces with a smooth cylindrical fit in the outer casing-sleeve, balls in contact with the inner bearing part and outer bearing-blocks, and thrust-resisting means for holding the bearing-blocks against the thrust of the balls.

4. An antifriction-bearing having an inner integral bearing part providing a plurality of ball-races with two points of contact for each ball, an outer casing-sleeve, outer bearing-blocks having inner spherical surfaces providing one point of contact for each ball on a portion of such surface oblique to the axis of the bearing and having outer surfaces with a smooth cylindrical fit in the outer casing-sleeve, balls in contact with the inner bearing part and outer bearing-blocks, and thrust-resisting and closing means for holding the bearing-blocks against the thrust of the balls and closing the casing from the outer casing-sleeve approximately to the inner bearing part, substantially as set forth.

5. An antifriction-bearing having an inner bearing part providing a plurality of ball-races with two points of contact for each ball, an outer casing-sleeve, outer bearing-blocks having inner surfaces providing one point of contact for each ball on a portion of such surfaces oblique to the axis of the bearing and having outer surfaces with a smooth cylindrical fit in the outer bearing-sleeve, balls in contact with the inner bearing part and outer bearing-blocks, and thrust-resisting and closing means for holding the bearing-blocks against the thrust of the balls and closing the casing from the outer casing-sleeve approximately to the inner bearing part, substantially as set forth.

6. An antifriction-bearing having an inner bearing part providing a plurality of ball-races with two points of contact for each ball, an outer casing-sleeve, outer bearing-blocks having inner spherical surfaces providing one point of contact for each ball on a portion of such surfaces oblique to the axis of the bearing and having outer surfaces with a smooth cylindrical fit in the outer bearing-sleeve, balls in contact with the inner bearing part and outer bearing-blocks, ball-retainers contracting the mouths of such ball-races, and thrust-resisting and closing means for holding the bearing-blocks against the thrust of the balls and closing the casing from the outer casing-sleeve approximately to the inner bearing part, substantially as set forth.

In testimony whereof I have affixed my signature in presence of two witnesses.

VIETTS L. RICE.

Witnesses:
WILLIAM H. SHEPARD,
HENRY D. WILLIAMS.